United States Patent
Kikinis

[19]

[11] Patent Number: 5,841,424
[45] Date of Patent: Nov. 24, 1998

[54] USB TO MULTIPLE CONNECT AND SUPPORT BAYS FOR PERIPHERAL DEVICES

[75] Inventor: Dan Kikinis, Saratoga, Calif.

[73] Assignee: Lextron Systems, Inc., Saratoga, Calif.

[21] Appl. No.: 811,118

[22] Filed: Mar. 3, 1997

[51] Int. Cl.[6] ....................................................... G09G 5/00
[52] U.S. Cl. ........................................... 345/168; 345/156
[58] Field of Search ..................................... 345/168, 169, 345/156, 901, 903, 905, 527, 200.51, 200.6, 281, 282, 284, 285, 286; 364/708

[56] References Cited

U.S. PATENT DOCUMENTS 5,400,055  3/1995  Ma et al. ................................. 345/168
5,592,362  1/1997  Ohgami et al. .......................... 364/708
5,610,631  3/1997  Bouton et al. ........................... 345/168

*Primary Examiner*—Matthew Luu
*Attorney, Agent, or Firm*—Donald R. Boys

[57] ABSTRACT

A keyboard compatible with Universal Serial Bus protocol has multiple bays with physical engagement interfaces and electrical connectors for supporting serial-compatible peripheral devices. Identical bays in the keyboard, having a common physical shape and electrical pin matrix, are adapted to specific peripheral devices by use of adapters that interface both with the generic bay and the specific peripheral device. Translation between USB protocol and standard serial protocol is accomplished by enhancements to a keyboard controller in the keyboard that also serves conventional keyboard functions.

15 Claims, 6 Drawing Sheets

USB TO MULTIPLE CONNECT AND SUPPORT BAYS FOR PERIPHERAL DEVICES

FILED OF THE INVENTION

The present invention is in the field of computer peripheral device connection and control, and has particular but not exclusive application to keyboard devices as they relate to peripherals and their relationship to a PC.

BACKGROUND OF THE INVENTION

As Computer Technology in the field of PC manufacturing becomes more sophisticated, the capability of PCs to link to many peripherals at the same time has become more commonplace. The end user can choose from a wide range of computer peripherals to enhance his experience with the PC. Typically, peripherals are designed to interface with a program or application being run on a PC. The peripheral may send data to the PC, retrieve data from the PC, or perform some other function, such as an input or output device for multimedia applications (speakers, printers, an the like). Some peripherals have on-board memory installed and may be powered by batteries, such as, for example, a Personal Digital Assistant (PDA).

An association of private manufacturers has lately created a universal standard and method for linking many peripherals to a PC simultaneously. This standard is called the Universal Serial Bus (USB).

Although the newly-introduced USB provides for integration of many peripherals to a PC, there are cost problems associated with providing a connection to a relatively low-cost peripheral device. For example, suppose a peripheral costs from $50.00 to $80.00 retail. The cost of material paid by the manufacture would be around $30.00, not including labor or overhead. The added cost of installing the USB connection, ($4.00 to $5.00), further taxes the profit margin associated with the peripheral, resulting very often in a decision by the manufacturer not to provide the USB capability. In a case such as this, the manufacturer would typically provide a relatively slow-speed serial port and may or may not include the cable, which is often considered an accessory. An end user requiring five or more low-cost peripherals would then have a mass of cables, added serial ports (if the expansion capability of his/her computer allows it), and switches to work with, all of which was originally intended to be eliminated by USB.

What is clearly needed is a unique docking and connection station that is equipped to act as a station for low-cost peripherals serial-communicating peripherals using standard pin connectors, and capable of interfacing these serial-equipped peripherals to a Universal Serial Bus.

SUMMARY OF THE INVENTION

In a preferred embodiment of the present invention a docking station for computer peripherals is provided, comprising a Universal Serial Bus (USB) communication link adapted to connect to a USB node; translator circuitry coupled to the USB communication link; a serial communication link coupled to the translator circuitry; and a docking bay adapted to physically support and electrically connect a serial computer peripheral device to the serial communication link. The translator circuitry is adapted to translate serial code to USB code and USB code to serial code in a bi-directional manner between the serial communication link and the USB.

In some embodiments there are multiple docking bays each coupled by serial communication link to the translator circuitry. The multiple docking bays may be each connected to a multiplexer and the translator circuitry connected to the multiplexer by a single serial link and select-signal lines, and serial communication may thus be switched on a rotating basis to the docking bays in these embodiments. One or more power pins may also be provided to charge on-board storage cells in docked devices. In some embodiments as well there may be at least one adapter configured to plug into any one of the docking bays and to provide a physical interface and an electrical connector to support a specific serial peripheral device. Such adapters may comprise a charge adapter circuit adapted to accept power from a docking port at one voltage and to provide power therefrom to the electrical connector at a second voltage required by the specific serial peripheral device. The docking station in a preferred embodiment is a USB keyboard.

The invention in its various embodiments provides an apparatus and method whereby a PC user can connect several serial-compatible peripheral devices to a USB node connected to his/her computer without the trouble and expense of expansion cards and multiple serial cables and switches. This invention makes it unnecessary for manufacturers of relatively inexpensive peripherals to make their peripherals compatible with USB, while still retaining the market target of USB users.

BRIEF DESCRIPTION OF THE DRAWINGS FIGURES

DESCRIPTION OF THE PREFERRED EMBODIMENTS

Figure 1:
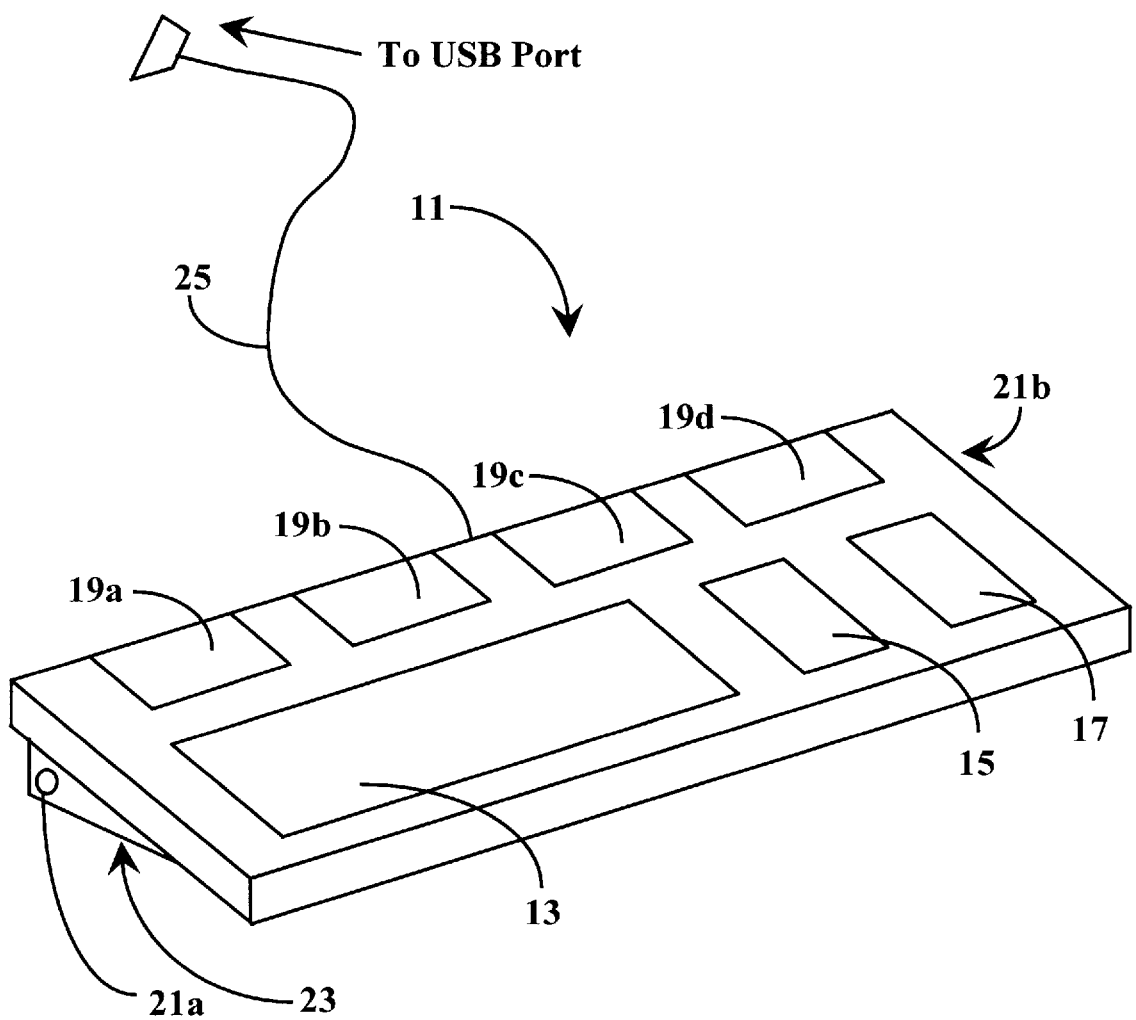
FIG. 1 is an isometric view of a keyboard in an embodiment of the present invention.

FIG. 1 is an isometric view of a keyboard 11 in an embodiment of the present invention. A keyboard as used in embodiments of the present invention described herein, is a convenient station to be adapted as a serial-to-USB station, but is illustrated as a convenient embodiment rather than as a limitation. In other embodiments of the invention other known devices could be adapted as such stations, or such stations could be provided as stand-alone devices independent of existing devices like keyboards.

Keyboard 11 rests on a base structure 23. Base structure 23 supports input connectors 21a and 21b in this embodiment, which may be used for the purpose of connecting a mouse or other accessories to keyboard 11. Connectors 21a and 21b are not limiting or pertinent to embodiments of the present invention. A USB cable 25 provides a connection to a USB port on a PC.

Keyboard 11, in an embodiment of the present invention, supports a number of bays 19a–19d that are shown covered. In various embodiments of the invention snap-in plastic covers are provided to protect such bays when not in use. Bays 19a–19d are designed to accept special adapters for the purpose of stationing peripherals on keyboard 11. It will be apparent to those with skill in the art that there may be more or fewer than four such bays, and there is nothing particularly significant about the fact that four are shown in the instant embodiment. Adapters and peripherals, as described in emodiments of the present invention, are described below with reference to other drawing figures.

There are four bays 19 illustrated in FIG. 1, however, keyboard 11 may support more or less depending on the number of peripherals to be stationed, as described immediately above. Standard elements of keyboard 11 include a typical main field of keys 13, a standard cursor field of keys 15, and a standard numeric field of keys 17.

Keyboard 11 can be manufactured using low cost durable polymers, as is standard in the art, or any other suitable material. Keyboard 11, in an embodiment of the present invention, may support additional features, such as, special keys or switches, as may be required to interface with certain elements, such as, bays 19 or peripherals etc. It will be apparent to one with skill in the art that there are many ways to design and implement the features of keyboard 11 without departing from the spirit and scope of the present invention.

Figure 2:
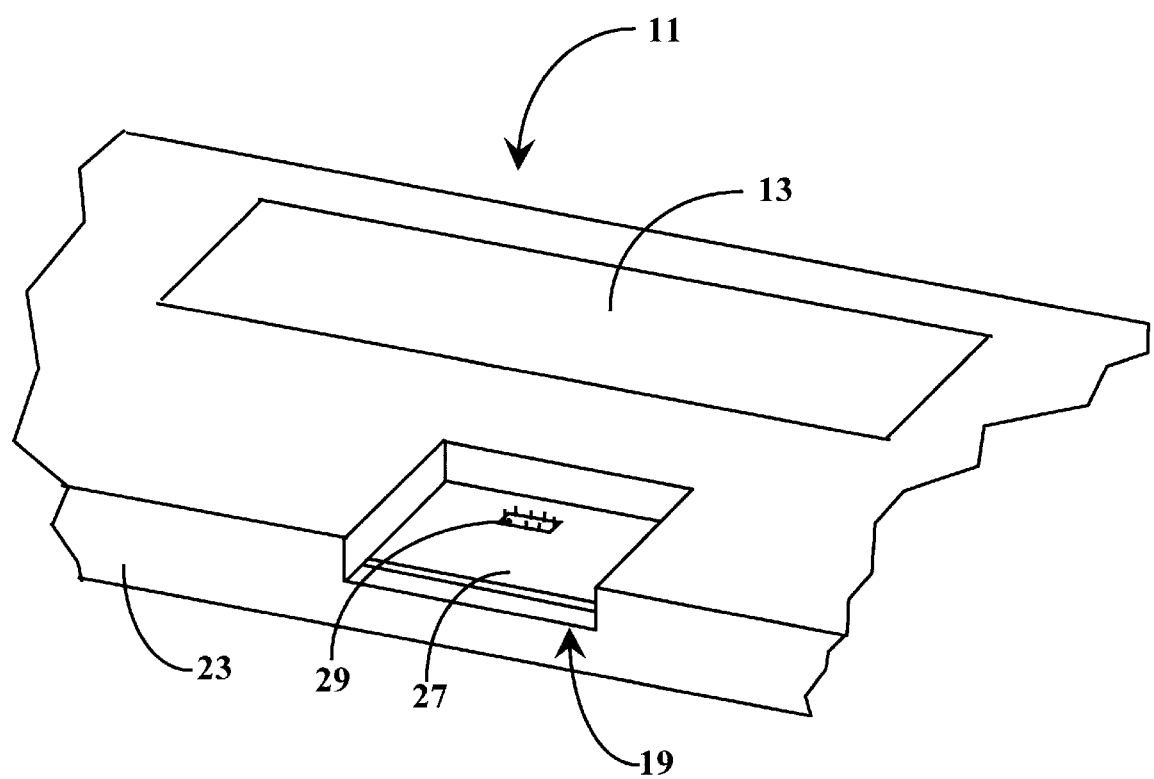
FIG. 2 is an isometric breakaway view of a section of the keyboard of FIG. 1, viewed from the rear, showing an uncovered bay with a pin connector attatched to a Printed Circuit Board (PCB).

FIG. 2 is an isometric broken view of a section of keyboard 11, viewed from the rear, in an embodiment of the present invention, wherein bay 19a is shown uncovered, revealing a pin matrix 29 connected to traces of a PCB (Printed Circuit Board) 27. Pin matrix 29 contains pins providing a serial port connection as well as power and ground pins, and is typical to each bay 19a–19d that is incorporated into keyboard 11. Other pins that may be present in pin matrix 29 are connections to other components or elements, such as active or select signals. The necessary communication functions required to interface with other components in embodiments of the present invention are incorporated into PCB 27 and devices connected to PCB 27. It will be apparent to one with skill in the art that there are many ways PCB 27 may be provided to accommodate the unique capability of communicating with selected bays 19a–19d in embodiments of the present invention, while still retaining the normal funtions of a standard keyboard associated with interfacing with a PC. Base structure 23, described briefly in FIG. 1, is shown as a solid support structure extending the length of keyboard 11. Main key field 13 is shown for reference.

Figure 3:
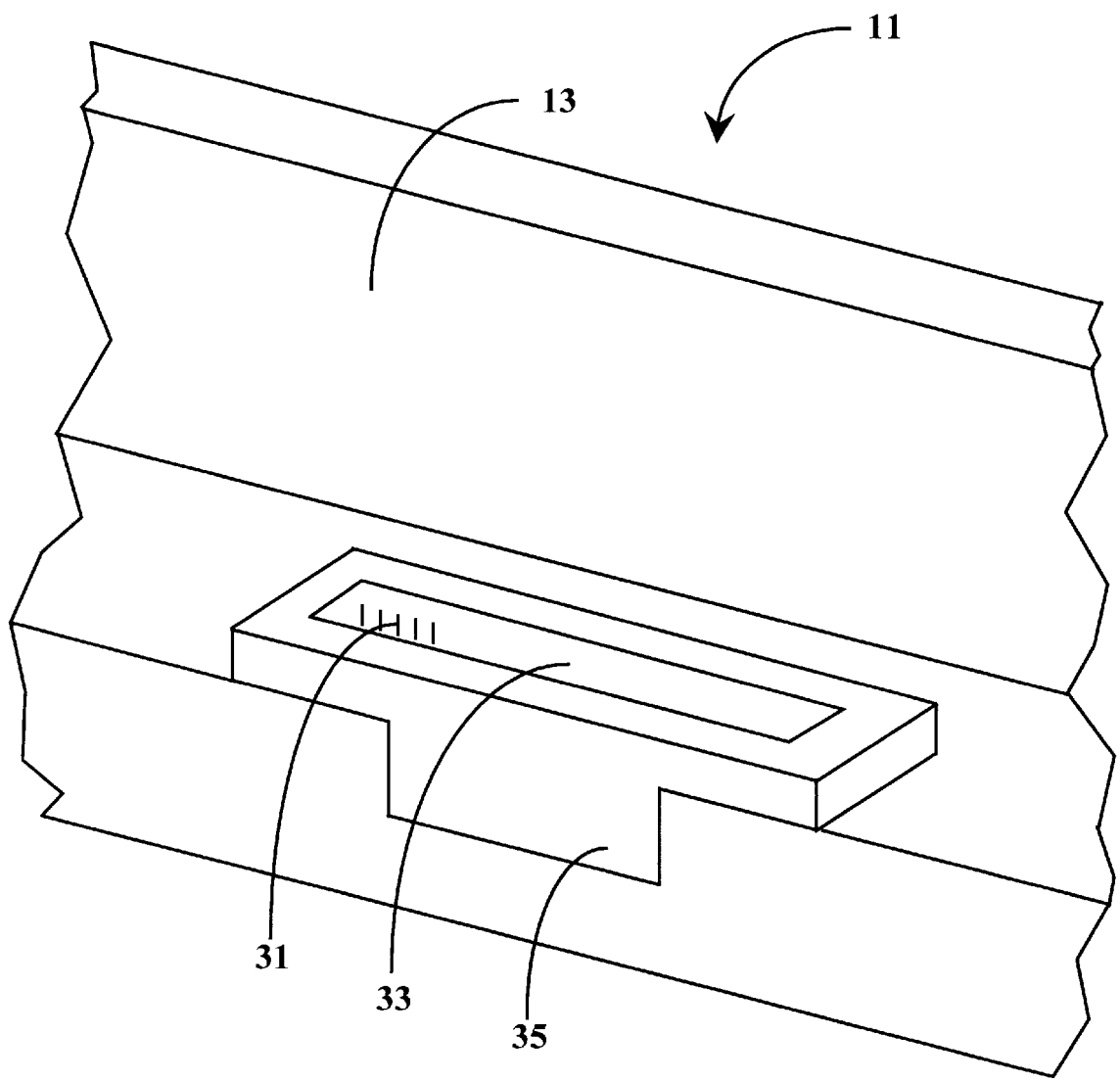
FIG. 3 is a magnified isometric broken view of the section of the keyboard of FIG. 1 illustrated in FIG. 2, showing an adapter seated into the bay and a pin connector matrix in a slot of the adapter as used in an embodiment of the present invention.

FIG. 3 is a magnified isometric broken view of the section of keyboard 11 shown in FIG. 2, viewed in the same direction, showing an adapter 35 seated into bay 19 in an embodiment of the present invention. Adapter 35 is equipped with a female connector (not shown) on it's lower interfacing surface for the purpose of mating to pin matrix 29 shown in FIG. 2. When adapter 35 is properly seated in a bay, electrical connection is made and a peripheral pin matrix (PPM) 31 is activated, presented to be available for connecting devices from above the keyboard. PPM 31 contains pins adapted to provide serial communication, and pins for power and ground. Other pins in the PPM may be provided specifically to mate with a female connector of a peripheral device meant to be docked in the adapter, and some such pins may be specific to the peripheral to be docked in that particular bay.

Since peripherals typically vary in shape and function, adapter 35 that interfaces with a specific peripheral is provided to act as a socket for that specific peripheral, allowing the peripheral to seat and connect to PPM 31. The lower shape of adapters is common, and the upper cradle slot and connector is provided for a specific peripheral. For example, adapter 35 in FIG. 3 is designed with a cradle slot 33 to provide a fit to a rectangularly shaped peripheral, such as a Personal Digital Assistant (PDA) 37 as described briefly in the background section.

Typically in peripherals adapted to dock in bays in embodiments of the present invention, the peripherals require a serial port, and perhaps a pin at a specific voltage to charge a battery in the peripheral device. Pins for these purposes are provided via PPM 31. Internal elements of adapter 35 may include elements such as charging circuitry, detection circuitry, electrical amplifiers or other components that the specific peripheral for which the adapter is provided may require. It will be apparent to one with skill in the art that there are many different configurations, both electrical and mechanical, that may be incorporated into adapter 35 for the purpose of allowing a successful interface to a specific peripheral device without departing from the spirit and scope of the present invention. Further examples of these differences are to be described below.

Figure 4:
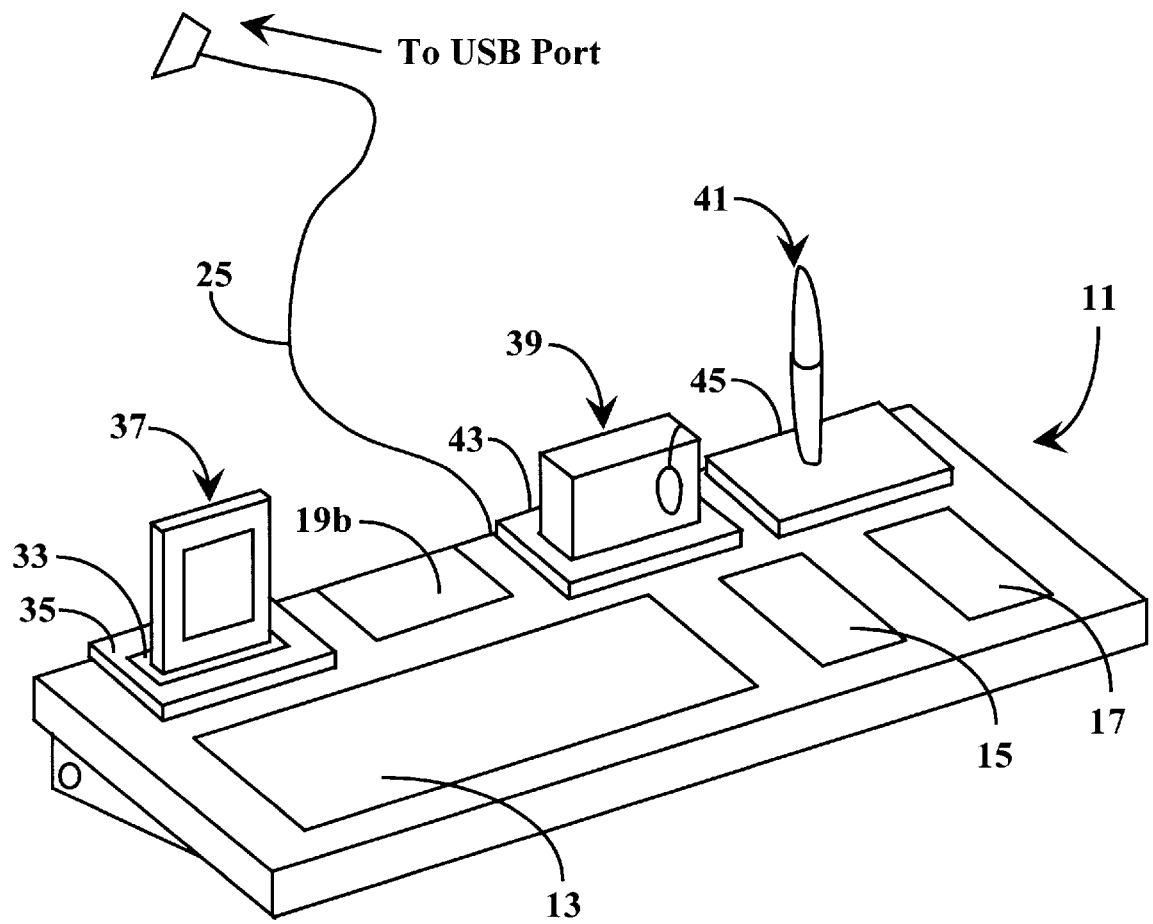
FIG. 4 is an isometric view of the keyboard of FIG. 1 in an embodiment of the present invention, showing peripherals connected to adapters stationed in bays.

FIG. 4 is an isometric view of keyboard 11, in an embodiment of the present invention, showing three different peripherals, a PDA 37, a music player 39, and a pen recorder 41, stationed in assigned adapters 35, 43, and 45. Bay 19b is shown covered and without an adapter or peripheral to illustrate the independent functioning properties of each bay. In a preferred embodiment of the present invention, adapters 35, 43, and 45 are interchangeable in bays 19a–19d because the connectors on the bay interfacing side are the same. However, peripherals cannot generally interchange with adapters as mechanical and electrical configurations are matched case by case as described in FIG. 3. For example, PDA 37 seated in adapter 35, cannot change locations with pen recorder 41 seated in adapter 45 and so on. As described in FIG. 3, circuitry housed in each adapter is tailored to the assigned peripheral and contains the required components to allow peripherals with different voltage requirements to draw off the same power supply in the keyboard or connected to the keyboard.

In preferred embodiments of the present invention, PPM 31 is a live connector as long as the adapter is seated properly allowing a user to remove any peripheral docked in an adapter for use in another location, and then to return it to it's assigned adapter, where it may perform various functions such as synchronizing files with a connected PC, downloading data of various sorts and the like, and also recharges at the same time, automatically. For example, the user may take PDA 37 to work on files in a board meeting. Upon return, the user plugs PDA 37 back into it's assigned adapter 35. The files are then synchronized with files in the PC connected to the keyboard while the PDA 37 is receiving a fresh charge for the next use.

In another example, music player 39 contains music downloaded from a storage location on the PC connected to the keyboard or via PC from the Internet. When the user leaves for break, he lifts music player 39 from its assigned adapter cradle 43, takes it along, and uses it to listen to the music. When he returns, he plugs music player 39 back into assigned adapter cradle 43 to perhaps exchange old music data with new music data available on the PC. As this process continues, the battery is recharged simultaneously.

It will be apparent to one with skill in the art that there many ways one might add features and peripherals to keyboard 11 without departing from the spirit and scope of the present invention. For example, in one embodiment, special keys or switches may be included on keyboard 11 or on an adapter for a peripheral to activate commands assigned to a specific peripheral that may have multiple functions. In another embodiment, keyboard 11 may have an additional panel containing many more bays for stationing any number of peripherals. Also, in yet another embodiment, there may be no keyboard, but just a row of ports, with one common USB port for connection to a PC.

Figure 5:
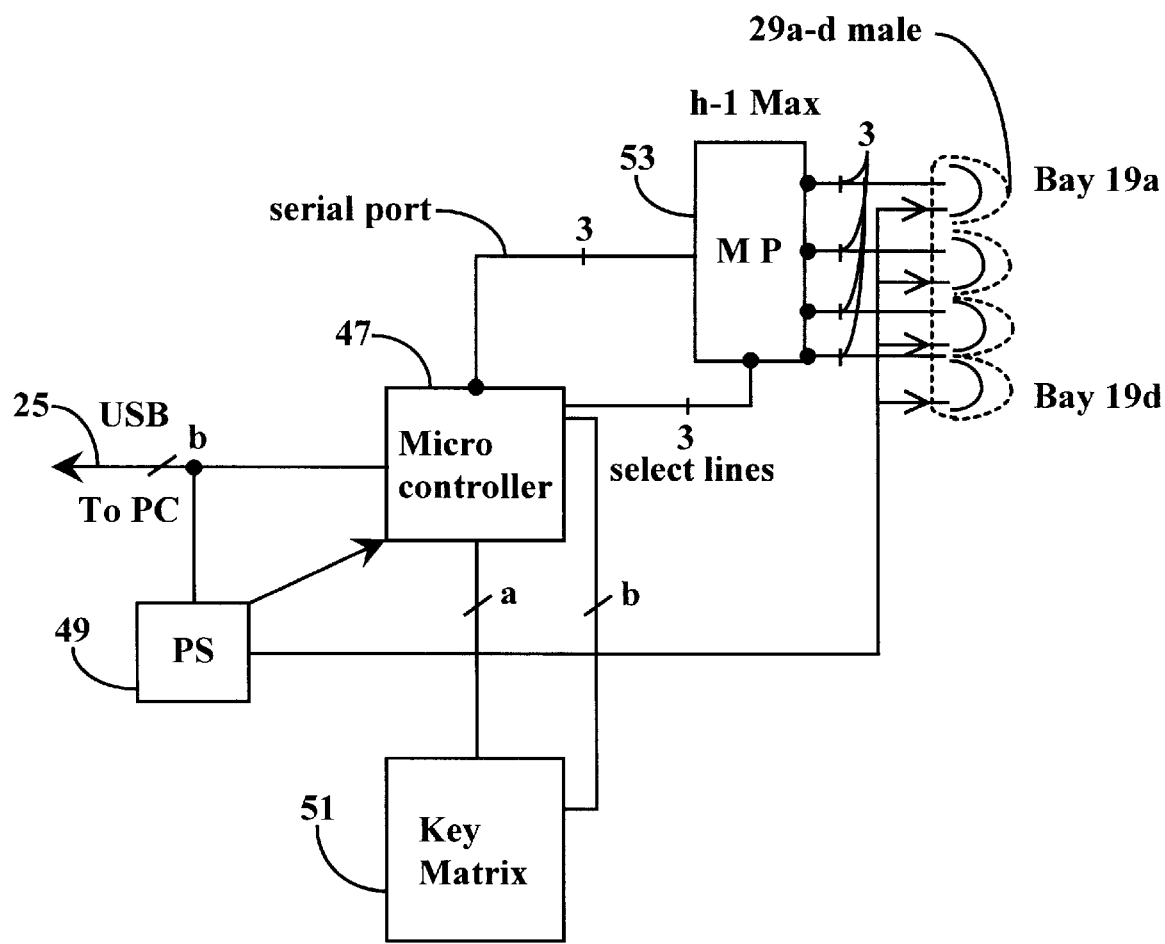
FIG. 5 is an illustration of internal electronic architecture of the keyboard of FIG. 1 in an embodiment of the present invention.

FIG. 5 is an illustration of internal architecture of keyboard 11 in an embodiment of the present invention. Microcontroller 47 is unique by virtue of functionality through its firmware, as it is used in an embodiment of the present invention, because it has the capability to convert and transfer serial code to USB code and vise versa. An outer casing (not shown), supports a USB connector in some embodiments of the invention. In other embodiments cable 25 may be hardwired to the keyboard. Power supply element 49 derives power in this embodiment from cable 25 and distributes power to microcontroller 47 and bays 19a through d, as well as to other elements requiring power at the keyboard or connected to the keyboard.

In an embodiment of the present invention, microcontroller 47 maintains normal operations with key matrix 51 through standard A×B communication as is common with other keyboards and known in the art. A serial port in microcontroller 47 connects in this embodiment to a multiplex switch 53. Multiplex switch 53 communicates with pin matrices 29 in bays 19a through 19d. Three select lines running from micro controller 47 to multiplex switch 53 serve to select the bay 19 for any instant data transfer. It will be apparent to one with skill in the art that differing numbers of bays may be supported by one serial port in the microcontroller by providing appropriate multiplexing with selectability. For example, eight separate bays may be supported with the multiplexer shown, although four are shown and described.

In an alternative embodiment of the present invention multiple serial ports may be implemented in the microcontroller, or in chips or chip sets connected to the microcontroller, and each port connected to a bay in a manner that each bay is supported simultaneously from the viewpoint of communication between the microcontroller and the bays. In such an embodiment multiplexing would not be used in the sense described above.

Figure 6:
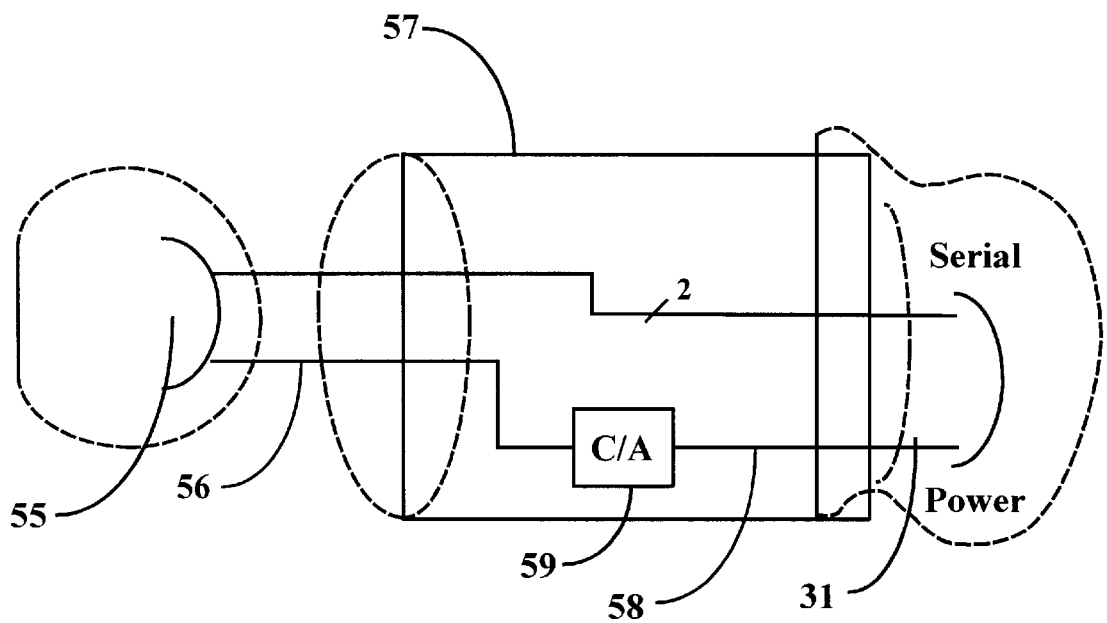
FIG. 6 is a simplified illustration of internal architecture of a typical adapter shown in FIGS. 3 and 4 in an embodiment of the present invention.

FIG. 6 is a simplified illustration of internal electrical architecture of a typical adapter as is used in an embodiment of the present invention. A female connector 55 mates with pin matrix 29 in bays 19a through 19d. Mechanical surface 57 is formed to fit or seat into bay 19 as described in FIG. 4. The actual shape of adapter 35 and it's bay 19 may vary as long as the electrical connection can be made with the mechanical fitting of adapter 35 to bay 19 dictating the alignment of the pin matrix 29 to the female connector 55. As described previously in FIG. 5, the circuitry inside the adapter is designed to accommodate the assigned peripheral as long as the connections are maintained. PPM 31 is the final connection to be made to the female connector, (not shown), at the interfacing surface of the assigned peripheral.

In this embodiment as a minimum there are two lines dedicated to serial transmission. There is also a charging adapter C/A 59 having one incoming line 56 at the voltage provided by the keyboard power supply distribution, and an outgoing line 58 at the voltage required by the specific peripheral for which the adapter is provided. The charging adapter converts the one voltage to the other. In some cases, the voltage required by the peripheral may be the same as the voltage provided by the keyboard power distribution, so no charging adapter will be needed.

The configuration shown in FIG. 6 is exemplary and represents a minimum situation. In other embodiments there may be more pins and more functionality than serial communication and power. In some cases, the device may not even have a serial connection, but some proprietary port. In those cases, the adapter may also contain a converter, typically a microcontroller (not shown) in the data path to do adaptation for the data signal to the required port.

It will be apparent to those with skill in the art that there may be many alterations made in the embodiments disclosed and taught herein without departing from the spirit and scope of the present invention. Many such departures have been described above, such as the fact that the invention is not limited to a keyboard, but may be implemented in other forms as well. In other embodiments docking apparatus for serial peripherals may be provided and connected at any convenient USB node, such as at a connected printer. In yet other embodiments peripheral docking of the sort described may be provided in a telephone connected to a USB node. In yet other embodiments docking devices of the sort taught above may be provided to connect to other bus protocols than USB. For example, in an alternative embodiment, a docking station according to the invention may have a microcontroller having a serial port to a multiplexer providing multiple docking stations for serial devices as described above, and the microcontroller may have a second serial port with a cable to connect to a serial port of a PC, thereby providing a docking station capable of expanding the utility of a single serial port to serve several serial peripheral devices docked in bays as described above.

There are many configurations and materials that might be used, and many differences in dimension and number within the scope of the invention. There are similarly many other alterations that might be made without departing from the spirit and scope of the invention.

What is claimed is:

1. A docking station for computer peripherals, comprising:
   a Universal Serial Bus (USB) communication link adapted to connect to a USB node;
   translator circuitry coupled to the USB communication link;
   an industry standard serial communication link other than USB coupled to the translator circuitry, and adapted to communicate by industry standard serial code other than USB code; and
   a docking bay adapted to physically support and electrically connect an industry standard serial computer peripheral device other than USB to the industry standard serial communication link other than USB;
   wherein the translator circuitry is adapted to translate the industry standard serial code other than USB into USB code and USB code into the Industry Standard serial code other than USB in a bidirectional manner between the industry standard serial communication link other than USB and the USB communication link.

2. The docking station of claim 1 comprising multiple docking bays each coupled by the industry standard serial communication link other than USB to the translator circuitry.

3. The docking station of claim 2 wherein the multiple docking bays are each connected to a multiplexer and the translator circuitry is connected to the multiplexer by the industry standard serial communication link other than USB and select-signal lines, and wherein communication is switched on a rotating basis to the docking bays.

4. The docking station of claim 1 further comprising a power pin at the docking bay adapted to provide a voltage to recharge power storage units in the computer peripherals.

5. The docking station of claim 2 further comprising at least one adapter configured to plug into any one of the docking bays and to provide a physical interface and an electrical connector to support a specific peripheral device.

6. The docking station of claim 5 wherein the at least one adapter comprises a charge adapter circuit adapted to accept power from a docking port at one voltage and to provide power therefrom to the electrical connector at a second voltage required by the specific peripheral device.

7. The docking station of claim 1 comprising a Universal Serial Bus (USB) keyboard, wherein the translator and at least one industry standard serial port other than USB are implemented as part of the keyboard controller.

8. A PC Universal-Serial-Bus-compatible keyboard, comprising:
- a Universal Serial Bus (USB) communication link adapted to connect an on-board keyboard controller to a USB node;
- translator circuitry implemented as a part of the on-board keyboard controller and coupled to the USB communication link;
- an industry standard serial communication link other than USB coupled to the translator circuitry; and
- a docking bay adapted to physically and electrically connect an industry standard serial computer peripheral device other than USB to the industry standard serial communication link other than USB;
- wherein the translator circuitry is adapted to translate industry standard serial code other than USB code to USB code and USB code to industry standard serial code other than USB in a bi-directional manner between the USB link and the industry standard serial communication link other than USB.

9. The keyboard of claim 8 further comprising multiple docking bays each coupled by the industry standard serial communication link other than USB to the translator circuitry.

10. The keyboard of claim 9 wherein the multiple docking bays are each connected to a multiplexer and the translator circuitry is connected to the multiplexer by the industry standard serial communication link other than USB and select-signal lines, and wherein communication is switched on a rotating basis to the docking bays.

11. The keyboard of claim 8 further comprising a power pin at the docking bay adapted to provide a voltage to recharge power storage units in the industry standard serial computer peripheral device other than USB.

12. The keyboard of claim 9 further comprising at least one adapter configured to plug into any one of the docking bays and to provide a physical interface and an electrical connector to support a specific peripheral device.

13. The keyboard of claim 12 wherein the at least one adapter comprises a charge adapter circuit configured to accept power from a docking port at one voltage and to provide power therefrom to the electrical connector at a second voltage required by the specific peripheral device.

14. A method for connecting multiple computer devices adapted to communicate on industry standard serial protocol other than USB protocol to a single Universal Serial Bus (USB) node, comprising steps of:
(a) connecting a USB link to a translator adapted to translate bidirectionally between industry standard serial protocol other than USB protocol and USB protocol;
(b) connecting an industry standard serial communication link other than USB to the translator;
(c) connecting a docking bay for the industry standard serial peripheral computer device to the industry standard serial communication link other than USBF.

15. The method of claim 14 wherein, in step (c), multiple docking bays are connected to the translator.

* * * * *